United States Patent [19]

Yamaguchi et al.

[11] Patent Number: 4,882,630
[45] Date of Patent: Nov. 21, 1989

[54] PRINTING APPARATUS AND FACSIMILE EQUIPMENT

[75] Inventors: Hideya Yamaguchi, Hashima; Hiroyuki Hayasaki, Ogaki; Masamichi Kawakami, Hashima; Yuji Houjiyou, Hashima; Yoshihiro Hobo, Hashima; Youichirou Arimatsu, Anpachi; Yasunori Tsuji, Hashima; Masaaki Hasegawa; Seiji Katou, both of Anpachi, all of Japan

[73] Assignee: Sanyo Electric Co., Ltd., Osaka, Japan

[21] Appl. No.: 195,104

[22] Filed: May 16, 1988

[30] Foreign Application Priority Data

Jun. 12, 1987 [JP] Japan .................. 62-147368

[51] Int. Cl.$^4$ .................................. H04N 1/393
[52] U.S. Cl. ........................... 358/451; 358/434; 358/443
[58] Field of Search ............. 358/287, 280, 257

[56] References Cited

U.S. PATENT DOCUMENTS

| | | | |
|---|---|---|---|
| 4,580,171 | 4/1986 | Arimoto | 358/287 |
| 4,598,328 | 7/1986 | Honjo | 358/280 |
| 4,631,751 | 12/1986 | Anderson | 358/287 |
| 4,725,892 | 2/1988 | Suzuki | 358/287 |
| 4,731,658 | 3/1988 | Koseki | 358/287 |

Primary Examiner—Howard W. Britton
Attorney, Agent, or Firm—Darby & Darby

[57] ABSTRACT

A printing apparatus and a facsimile equipment incorporating the same according to the present invention are constituted as such that, when printing an original of, for example, A3 size by a printer of A4 size, the original read in the subscanning direction at reading is printed in the main scanning direction at printing, and at the same time, the image data in the main scanning direction and subscanning direction are enlarged or reduced respectively for printing so as to bring the length/widthwise ratio of a hard copy thus obtained equal to those of the original, so that when the facsimile including a A4 size printer receives the original of A3 size, the hard copy without distortion can be obtained with the smaller printer as compared with the original.

28 Claims, 11 Drawing Sheets

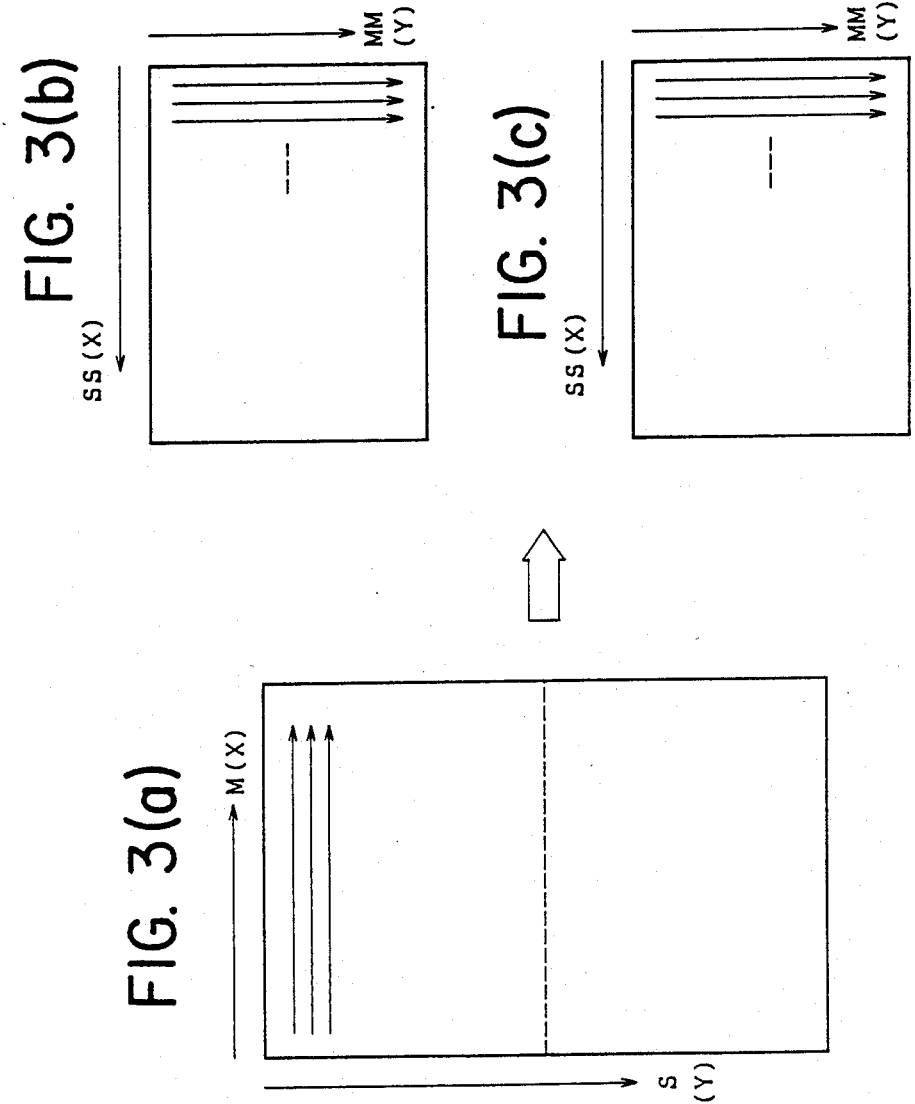

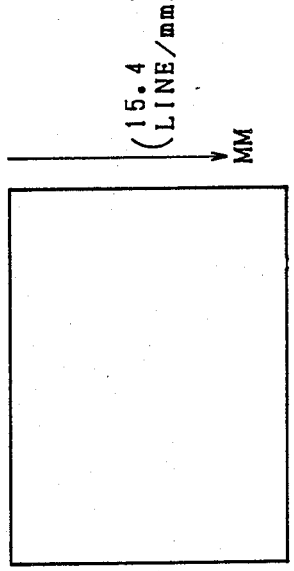
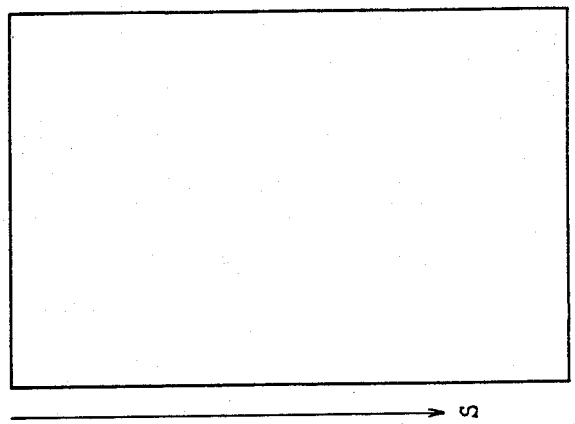

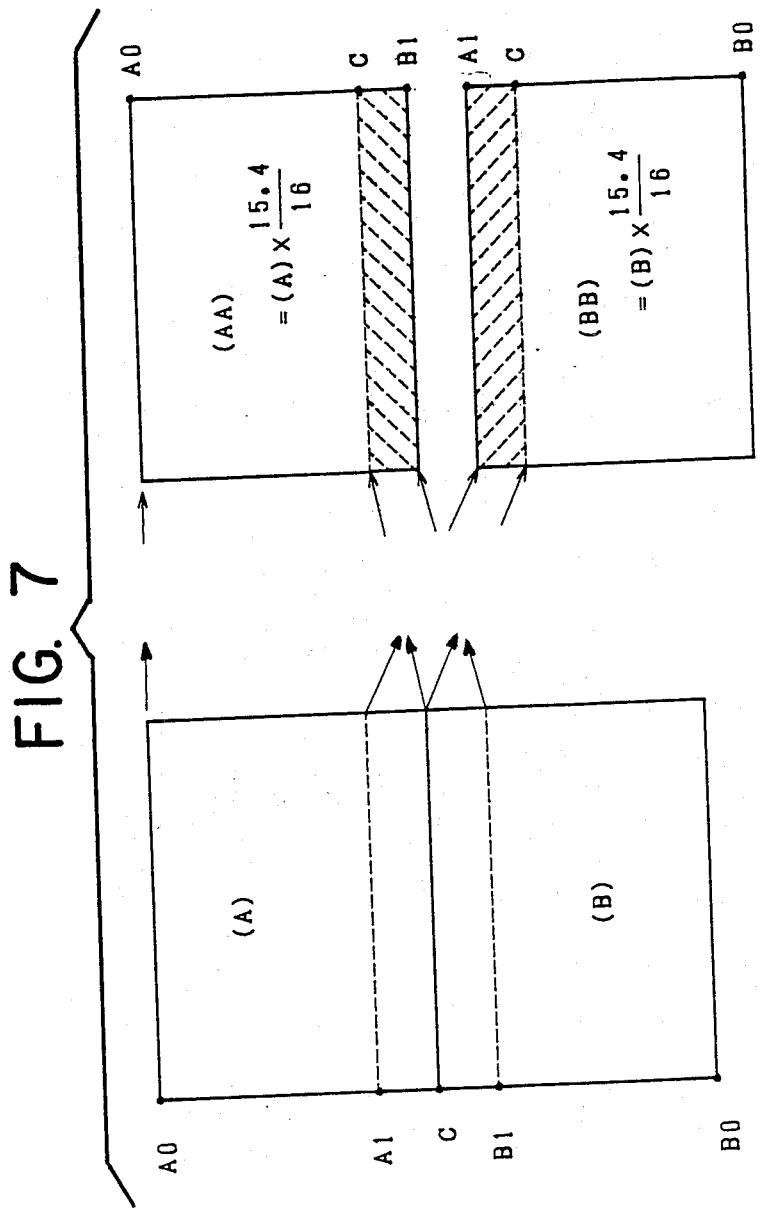

PRINTING APPARATUS AND FACSIMILE EQUIPMENT

BACKGROUND OF THE INVENTION

1. Field of the Invention

The present invention relates to a printing apparatus and a facsimile equipment incorporating the same and, more particularly, it relates to a printing apparatus and a facsimile incorporating the same having an image memory which temporarily stores an image data of one sheet of original image read as dot data by an image reading unit such as a scanner, or received by the communication with the other facsimile equipment.

2. Descrption of the Prior Art

A facsimile equipment which does not transmit or copy the original as the object to be transmitted or copied while reading it by means of a reading unit such as a scanner, or print the image data from the other facsimile equipment with a printing apparatus while receiving the same, but transmit or prints the image data which has been read or received and stored temporarily in one sheet of original image in an image memory is practically used.

Now in the aforementioned facsimile equipment, it is generally constituted as such that the conventional printing apparatus is allowed to print only the maximum size of, for example, A4 size (210×297 mm) or B4 size (257×364 mm) (B group is stipulated in JIS), thus when an image memory has a capacity of storing the image data of A3 size to the maximum larger than the A4 or B4 size, the original of A3 size (297×430 mm) which has been read.

In such facsimile equipment, since an image obtained by the printer or a hard copy is reduced in comparison with the size of the original, documents and the like are hard to read, and when a book or notebook is opened to provide one sheet of original of two pages, fine view is spoiled by a seam appeared in the center thereof.

With respect to such problems pertained to the conventional facsimile equipment, for example, Japanese Patent Laid-Open No. 61-198873 (1986) has been proposed.

The facsimile equipment of above invention is constituted as such that the image data which has been read is transmitted by dividing into the size corresponding to the print size of the facsimile equipment on the receiver side. The facsimile equipment also includes means for converting inversely the vertical and lateral reading of the image data or the main and subscanning directions. In addition, the facsimile equipment includes a memory means for storing one of the divided image data, and is adapted to transmit the other image data to the other facsimile equipment while storing the former in the memory means.

In such facsimile equipment, for example, the original which is composed of two opened pages may be divided in two portions after being read for printing. That is, after the original of two pages of A4 size is read as one A3 size, which may be divided in the center lengthwise to obtain two sheets of hard copies of A4 size.

In the facsimile equipment of such invention, however, a directional discrepancy of respective resolutions of the reading unit and printing apparatus come into problem.

That is, the resolution of the facsimile equipment is internationally standardized as such that, for example, the horizontal resolution in the main scanning direction of the reading unit is set at 8 pels/mm, and the vertical resolution in the subscanning direction at 7.7 lines/mm. Although not standardized, the facsimile equipment having the horizontal resolution of, for example, 16 pels/mm and the vertical resolution of 15.4 lines/mm is on the market. In such facsimile equipment, since pitches of the pels in the main scanning direction and subscanning direction are different when, for example, the image of A3 size is divided in two in the center lengthwise or in the subscanning direction at reading to obtain two hard copies of A4 size, the main scanning direction and subscanning direction change place at reading the A3 size original and at printing the read image as the A4 size hard copies respectively, so that the length/width ratio of the image differs from the original to produce distorted hard copies.

Likewise, when the image data of original of A3 size which has been read is divided into A4 size for transmission, even though the volume of image data is similar, the volume of code to be transmitted is increased in general, and moreover, a prescribed time is required for communication procedures respectively with respect to each sheet of image, so that it generally takes longer time than transmitting one sheet of A3 size image data.

SUMMARY OF THE INVENTION

The present invention is designed in view of such circumstances, therefore, a primary object of the present invention is to provide a printing apparatus, in which when lengthwise and widthwise scanning pitches are different at reading and printing an image, even though the length and width at reading and printing are converted, the length/width ratio of a hard copy is not distorted.

It is a second object of the present invention to provide a facsimile equipment in which by incorporating the printing apparatus embodying the first object, when the length and width of an original of, for example, A3 size are converted and divided in two, for exmaple, in A4 size for printing, the lengthwise and widthwise ratio of the hard copy thus obtained is not distorted.

It is a third object of the present invention to provide a printing apparatus in which a defective portion is not produced in the image, when printing a sheet of continuous image within A3 size in two sheets of hard copies of A4 size.

The printing apparatus of the present invention, when transferring the content of image memory having a storing capacity of, for example, A3 size to a printing unit, reads the lateral data of the original image, as the longitudinal data to be printed, and the longitudinal data of the original image, as the lateral data to be printed, and simultaneously enlarges or reduces the same so as to bring the length/width ratio in the case of printing by the printing unit equal to that of the original image. Thereby, for example, A3 size original can be divided in two in its longitudinal center to produce two hard copies of A4 size, and at the same time the hard copy which is exactly the same size as the original image, or having the length and width which are reduced or enlarged with the same ratio can be obtained without distortion in corresponding to its use.

The above and further objects and features of the invention will more fully be apparent from the following detailed description with accompanying drawings.

BRIEF DESCRIPTION OF THE DRAWINGS

FIG. 7 is an explanatory view of an other embodiment when two hard copies of A4 size are produced from an original of A3 size.

DESCRIPTION OF THE PREFERRED EMBODIMENTS

The present invention will be described hereunder in detail with reference to the drawings showing the embodiments.

Figure 1:
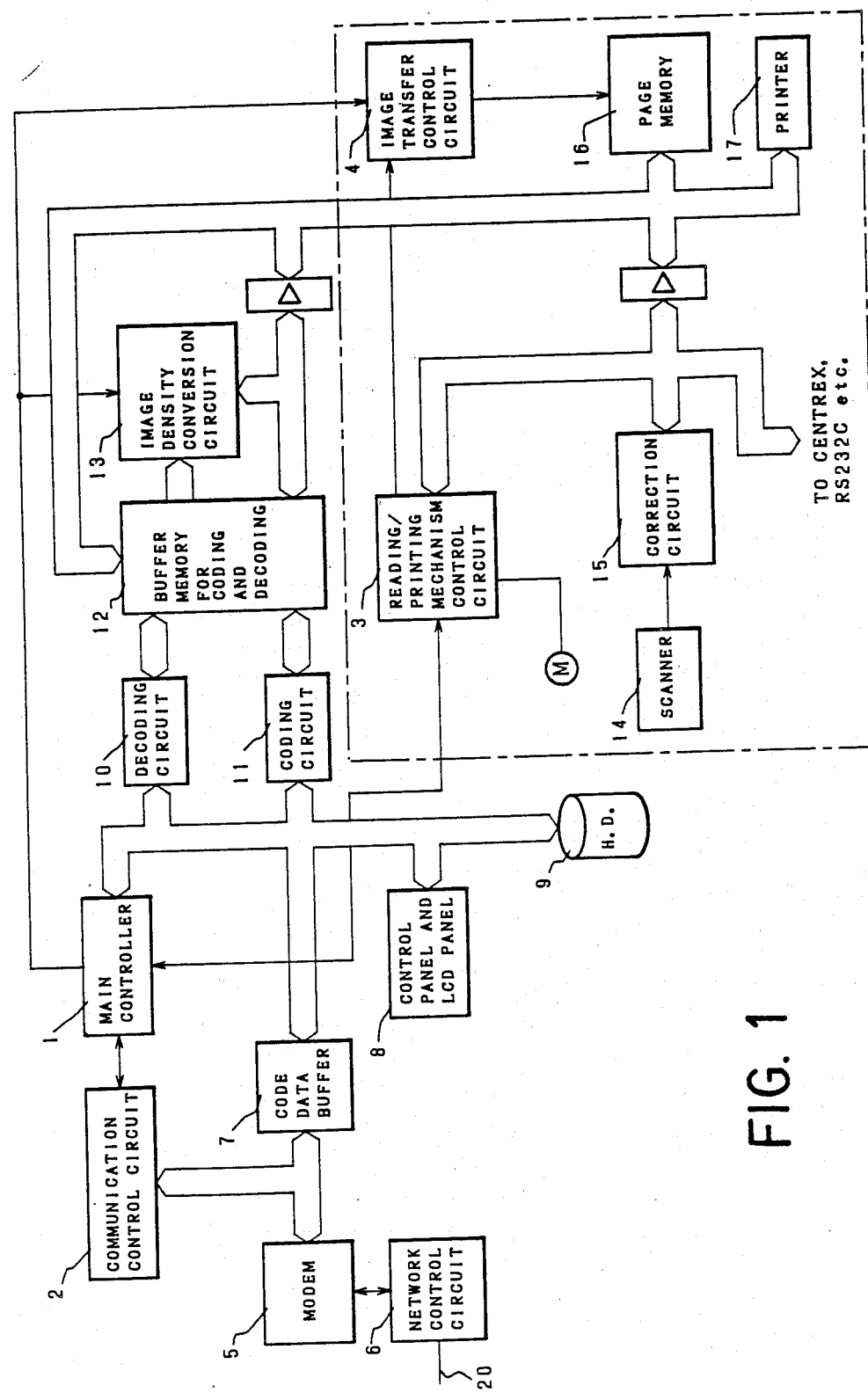
FIG. 1 is a block diagram showing a printing apparatus and a facsimile equipment incorporating the same according to the present invention.

FIG. 1 is a block diagram showing a circuit configuration of a printing apparatus and a facsimile equipment incorporating the same according to the present invention.

In FIG. 1, reference numeral 1 denotes a main controller for controlling the whole facsimile equipment of the present invention, more specifically, a microprocessor is used. The main controller 1 directly controls a communication control circuit 2, a reading/printing mechanism control circuit 3, an transfer control circuit 4, an image density conversion circuit 13 etc. to be described later.

The communication control circuit 2 manages the communication control between the other facsimile equipment and itself in accordance with the control signal provided from the main controller 1. More specifically, when transmitting to the other facsimile equipment, the communication control circuit 2 sends out the code data stored in a code data buffer 7 to a line 20 from a network control circuit 6 after transferring it to a modem 5 for prescribed modulation. When receiving from the other facsimile equipment, the communication control circuit 2 takes out the code data and transfers it to the code data buffer 7 for storage, after a signal transmitted through the circuit 20 is received by the network control circuit 6 and demodulated by the modem 5.

The reading/printing mechanism control circuit 3 controls the mechanism for reading and printing the image. That is, in the facsimile equipment of the present invention, a CCD scanner 14 using, for example, a one dimensional CCD line sensor or the like is incorporated as an image reading unit. The reading/printing mechanism control circuit 3 transfers the image data of the original image which has been read by the CCD scanner 14 as the dot data to a page memory 16 to be stored therein by one sheet of image after correcting it by a correction circuit 15. The reading/printing mechanism control circuit 3 also transfers the image data stored in the page memory 16 to a printer 17 as a printing unit for printing.

Meanwhile, the reading/printing mechanism control circuit 3 gives commands to the image transfer control circuit 4 by given commands from the main controller 1 to the reading/printing mechanism control circuit 3, so that the image transfer control circuit 4 controls transferring the image data. The image transfer control circuit 4 also transfers and controls the image data on the image data bus among the above-mentioned correction circuit 15, page memory 16 and printer 17, and the buffer memory 12 for coding and decoding and the image density conversion circuit 13 to be described later.

As will be described hereinafter, the image transfer control circuit 4 stores the image data read by the CCD scanner 14 in the page memory 16 in the direction X thereof as the main scanning direction and in the direction Y as the subscanning direction at reading of the original. The image transfer control circuit 4, however, includes an address generating circuit for memory which generates address for reading out the data so as to be possible to read out the image data from the page memory 16 in the direction X as the main scanning direction of the printer 17, and in the direction Y as the subscanning direction.

As the address generating circuit for memory, for example, Japanese Patent Laid-Open No. 62-272372 (1987) invented by some of the present inventors may be applied. The address generating circuit for memory of above invention in which memory planes of N having n×m bits are arranged in the direction n and those of M are arranged in the direction m, and the address in the direction n is accessed by N×i+x, y (where, x=0 to N−1, y=0 to n−1, i=0 to M−1), while the address in the direction m is accessed by Z (where, Z=0 to m−1), comprising a start address latching circuit which latches the start address representing the access start position, a first address latch register which retains the first line address when accessing in the direction m, an up-down counter which adds or subtracts aforementioned x and y one by one to output them as the access address for the memory, an add data generating circuit which latches N and outputting it as add data, an adder which adds the output of the add data generating circuit and the output of the up-down counter, and a second address latch register which latches the output of the adder, the up-down counter to which the output value N×i of the second address latch register is given after the start address from the start address latching circuit has been given when starting the access, takes in the first line address which is latched in the first address latch register when it reaches M, producing the next first line address on the basis thereof and latching the value in the first address latch register to access the memory in the direction m.

In addition, the image transfer control circuit 4 includes a scaling circuit (an enlarging and reducing circuit) which thins out the data read out as the data in the main scanning direction in accordance with a predetermined formula to reduce the image printed by the printer 17, and conversely overlapping the same to enlarge the image printed by the printer 17, when reading out the image data from the page memory 16.

The scaling circuit has the same configuration and function as the image density conversion circuit 13 to be described later, and for example, Japanese Patent Laid-Open No. 61-179671 (1986) applied by the same applicant who has applied the present invention in Japan may by used. The scaling circuit of above invention is an enlarging and reducing circuit for image information comprising, a latching circuit which inputs an retains the parallel data having any suitable number of bits, a parallel/serial conversion circuit which outputs the parallel data of the latching circuit in series by the timing of a first shift clock, an operation circuit which is possible to input the prescribed number of serial data from the parallel/serial conversion circuit to perform its logical adding operation, a serial/parallel conversion circuit which takes in the serial data from the operation circuit to output in parallel by the timing of a second shift clock, a reference clock generating circuit which generates a reference clock, a variable magnification clock generating circuit which inputs the reference clock to generate a variable magnification clock based upon an arbitrary variable magnification value, and a selector circuit which selects to output each reference clock and variable magnification clock as either of the first shift clock or the second shift clock.

Likewise, the maximum possible reading size of the CCD scanner 14 aforementioned is determined by the effective length of the line sensor, which is, in this embodiment, the width (a short side or widthwise) of A3 size. Thus, when the original of A3 size is read by the CCD scaner 14, its short side or widthwise becomes the main scanning direction. When the original is read by the CCD scanner 14, a motor M is driving and controlled by the reading/printing mechanism control circuit 3 for relative movement of the original at a predetemined velocity with respect to the line sensor.

The printer 17 is constituted by, as an example, a well known LED printer or laser printer of an electrophoto-graphic recording type, or a general thermal printer and the like in which thermal printing elements are arranged linearly, amd recording paper for obtaining the hard copy is moved relatively in the direction orthogonal thereto, the arranging direction of the printing elements being set as the main scanning direction, while the direction orthogonal thereto or the moving direction of the recording paper being set as the sub-scanning direction.

The page memory 16 is so-called a page memory which has a capacity large enough to store dot data as one sheet of image data which are transferred from the correction circuit 15 (CCD scanner 14) or buffer memory 12 for coding and decoding by the image transfer control circuit 4, the storing capacity thereof may be set, in this embodiment, at A3 size in response to the capacity of the CCD scanner 14.

As is described hereinbefore, the page memory 16 stores the image data read by the CCD scanner 14 therein in the direction X thereof as the main scanning direction, and in the direction Y as the subscanning direction at reading of the original. When the image data from the page memory 16 is read out, however, it is constructed to read out it in both directions X, Y as the main scanning direction respectively.

The coding circuit 11 compresses and encodes the image data obtained as the dot data and transferred from the page memory 16 to the buffer memory 12 and stored therein, in one line for transmission to produce the code data and to output it to the code data buffer 7. The decoding circuit 10 decodes the code data received from the other facsimile equipment and stored in the code data buffer 7 into the image data to be stored in the buffer memory 12.

In the figure, numeral 8 denotes a control panel and LCD panel through which various instructions are given by an operator to the facsimile equipment of the present invention, and numeral 9 indicates an external memory means, for example, a hard disk unit which stores the code data encoded by the coding circuit 11 or received from the other facsimile equipment.

The image density conversion circuit 13 converts the image density into half or double in accordance with a predetermined standard in such a manner that, when the image data read out from the page memory 16 or, for example, the image data read out at the horizontal resolution of 16 pels/mm as the main scanning direction, and at vertical resolution of 15.4 lines/mm as the sub-scanning direction of the CCD scanner 14 is transmitted to the other facsimile equipment, the image density is converted into half or 8 pels/mm and 7.7 lines/mm, or conversely when the image data received from the other facsimile equipment and decoded in the decoding circuit 10 is stored in the page memory 16, the image density is converted into double.

Meanwhile, the printing apparatus of the present invention is constituted by devices surrounded with broken lines in FIG. 1, that is, the reading/printing mechanism control circuit 3, image transfer control circuit 4, CCD scanner 14, correction circuit 15, page memory 16 and printer 17.

Operations of the printing apparatus and the facsimile equipment incorporating the same having such a circuit configuration will be described hereinunder.

Now, in the facsimile equipment of the present invention, three operations comprising a copying operation which is practicable only with the printing apparatus, an operation for transmitting the image data read out by the printing apparatus to the other facsimile equipment and an operation for producing a hard copy from the image data received from the other facsimile equipment by the printing apparatus are performed.

First, the copying operation will be explained. Meanwhile, in this case, the copying operation is designed to read the original by the CCD scanner 14 and to print it immediately with the printer 17, which is defined as the copying operation I to distinguish from the copying operation II which prints the image data received from the other facsimile equipment to be described later.

Figure 2:
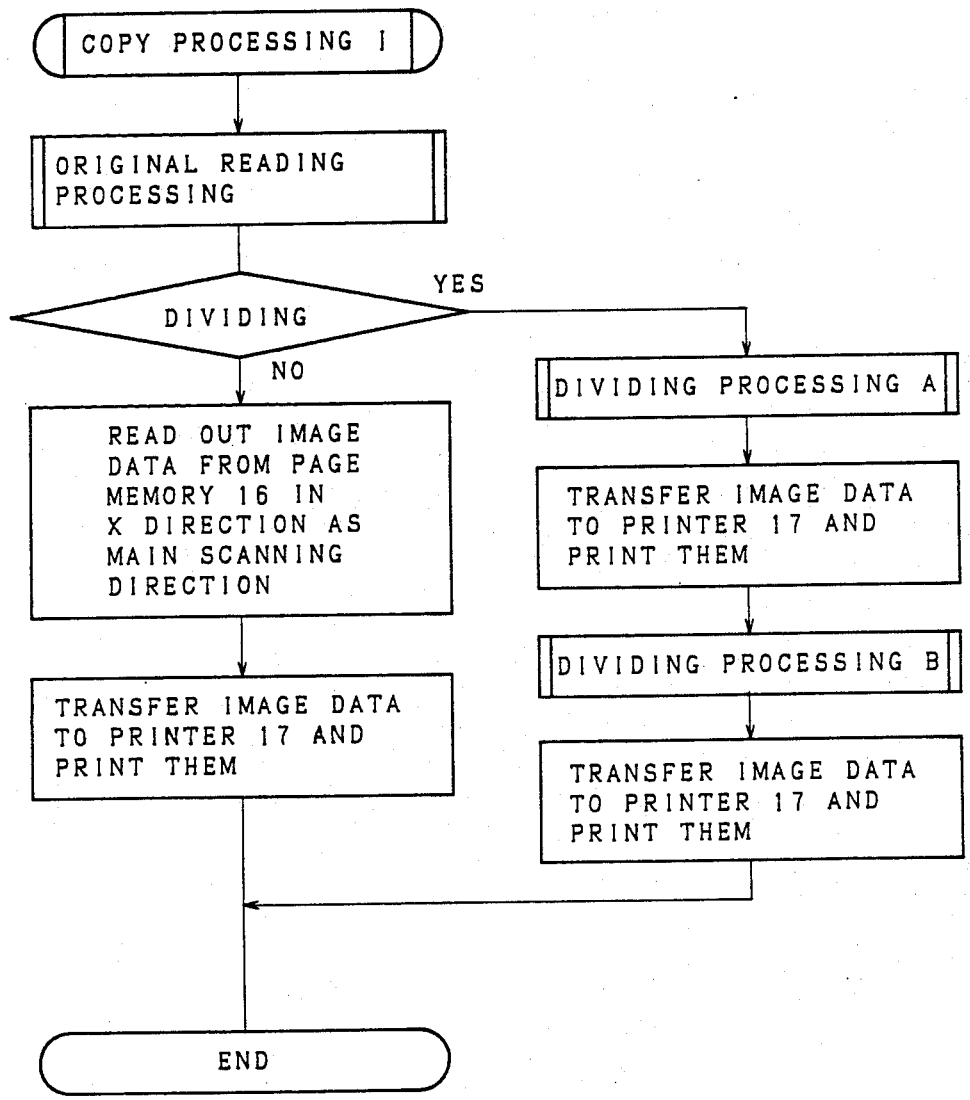
FIG. 2 is a flow chart showing procedures of copying processing (I) by the printing apparatus of the present invention, FIGS. 3 (a), (b) and (c) are explanatory view when two hard copies of A4 size are produced from an original of A3 size.

FIG. 2 is a flow chart showing procedures of the copying operation I.

When the original is set in the reading unit constituting by the CCD scanner 14 and copying instruction is given through the control panel and LED panel 8, the main controller 1 outputs the control signal to the reading/printing mechanism control circuit 3 which is turn drives and controls the motor M to send out the original, and at the same time stores the image data read out from the CCD scanner 14 in the page memory 16 through the correction circuit 15. In this case, the CCD scanner 14 reads the original in the widthwise direction (short side) of the original as the main scanning direction M, lengthwise direction (long size) thereof as the subscanning direction S, as shown in FIG. 3 (a). The image data which has been read is stored in the direction X of the page memory 16 as the main scanning direction M.

Figure 4:
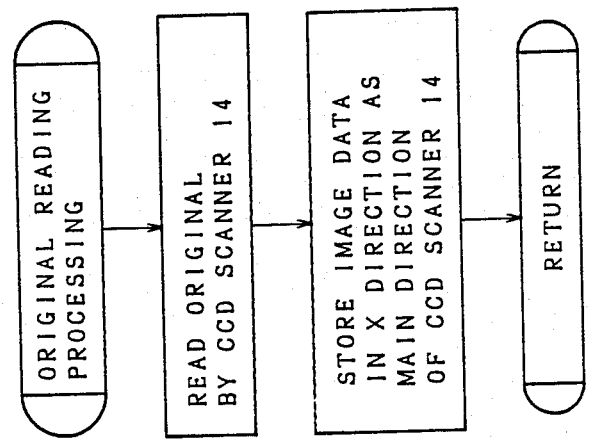
FIG. 4 is a flow chart showing reading procedures of an original, FIGS. 5 (a) and (b) are flow charts showing processing procedures when a sheet of original is divided in two to produce hard copies, FIGS. 6 (a) and (b) are schematic view illustrating how the length and width are reduced or enlarged when two hard copies of A4 size are produced from an original of A3 size.

A processing of reading the original is shown in a flow chart of FIG. 4.

Next, the image data stored in the page memory 16, is read out in the direction X as the main scanning direction and transferred to the printer 17 to produce the hard copy by the image transfer control circuit 4 under the control of reading/printing mechanism control circuit 3. In other words, the hard copy is produced with the main scanning direction at reading by the CCD scanner 14 as being the main scanning direction at printing by the printer 17.

At this time, if a plurality of copies are necessary, it is possible to transfer the image data stored in the page memory 16 to the printer 17 for a number of times to obtain a plurality of hard copies.

Figure 5B:
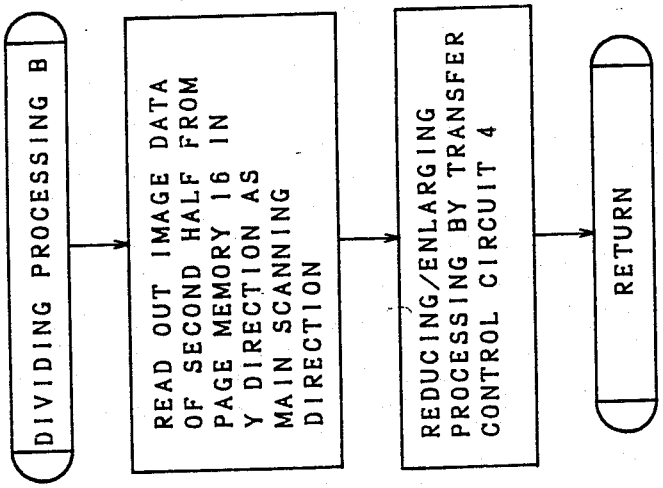
Figure 5A:
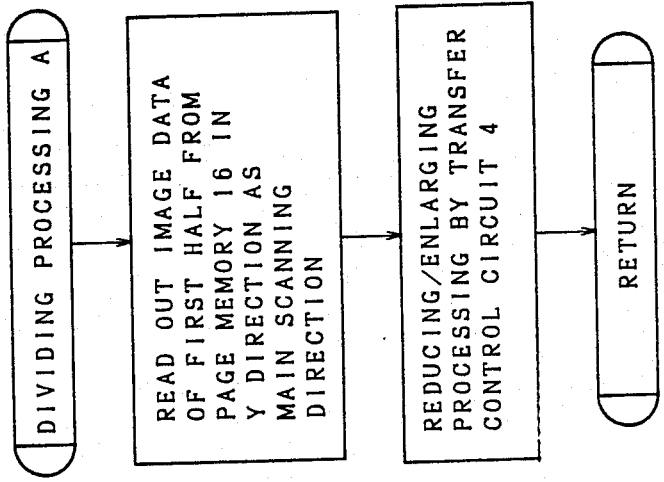

Now, in the copying operation I mentioned above, description will be made as to the case where the original image of A3 size is read by the CCD scanner 14 and divided in two, each having the A4 size, for printing. FIGS. 5 (a) and (b) are flow charts showing its processing procedures.

When the instruction for dividing the A3 size is given through the control panel and LCD panel 8, in the same way as aforementioned, the main controller 1 instructs the reading/printing mechanism control circuit 3 and image transfer control circuit 4 to read the original of A3 size in the CCD scanner 14 and to store the image data thus obtained in the page memory 16.

Resolution m in the main scanning direction M at reading by the CCD scanner 14 is set at 16 pels/mm or 16 dots per 1 mm, and resolution n in the subscanning direction S is set at 15.4 lines/mm or 15.4 dots per 1 mm.

The image data of the original of A3 size thus stored in the page memory 16 is divided in two as shown in FIGS. 3 (b) and (c) in the center in the direction Y indicated by broken lines in FIG. 3 (a), and read out in the direction Y as the main scanning direction. That is, the image transfer control circuit 4 reads out the image data from the page memory 16 in such a manner that, the main scanning direction M and subscanning direction S at reading of the original are inverted, the main scanning direction M (lateral direction of the original) at reading of the original of A3 size becomes the subscanning direction SS at printing by the printer 17, and the subscanning direction S (longitudinal direction of the original) at reading of the original becomes the main scanning direction MM at printing.

Namely, the image transfer control circuit 4 reads out the first half image data in the direction Y of the page memory 16 as the main scanning direction, and then the second half image data successively from the page memory 16 and transferring it to the printer 17 to obtain the hard copies. At this time, data in respective directions, that is, the main scanning direction and subscanning direction are suitably reduced or enlarged, specifically, to the ratio of (n/m);(m/n), thereby the hard copy without any distortion may be obtained.

Now, the procedure will be described hereinunder.

The image is read by the CCD scanner 14 at the ratio of 16 pels/mm in the main scanning direction M and 15.4 lines/mm in the subscanning direction S, so that when the main scanning and subscanning become inverse, for printing by the printer 17, the widthwise direction of the original of A3 size is enlarged by about 1.04 or 16/15.4 (=m/n) times to the lengthwise direction of the hard copy of A4 size, whereas the lengthwise direction of the original of A3 size is reduced by about 0.96 or 15.4/16 (=n/m) times to the widthwise direction of the hard copy of A4 size.

More specifically, as shown in FIG. 6 (a), if the original of A3 size is read by the CCD scanner 14, as shown in FIG. 6 (b), 15.4 (=n) dots per 1 mm are outputted to the printer 17 as the data for the main scanning direction M, and 16(=m) dots per 1 mm as the data for the subscanning direction S. Thus, if 15.4 dots in the lengthwise direction (vertical directions in FIG. 6 (a)) of the original image are enlarged to 16 dots or by m/n times for printing in the lateral direction (vertical direction in FIG. 6 (b)) of the hard copy of A4 size obtained by the printer 17, and 16 dots in the lateral direction of the original image are reduced to 15.4 dots or by n/m times for printing in the longitudinal direction of the hard copy, the size of which becomes same or equimultiple as the original.

Thus, the image transfer control circuit 4 reads out the image data divided in two in the center in the direction Y of the page memory 16, in the direction Y thereof as the main scanning direction of the printer 17, and in the direction X as the subscanning direction thereof, and transfers them to the printer 17 by enlarging the image data which has been in the subscanning direction S at reading of the original by 16/15.4 times, and reducing the image data which has been in the main scanning direction M at reading of the original by 15.4/16 times.

Thus, at reading of the original, a long side direction of the original of A3 size is enlarged by 16/15.4 times to a short side direction of the hard copy of A4 size, and a short side direction of A3 size is reduced by 15.4/16 times to a long side direction of A4 size for printing by the printer 17.

Meanwhile, a specific enlargement on the new addition and reduction of picture elements or lines, or processing of thinning the picture elements or lines may be effected with the image transfer control circuit 4 by the known art.

Now, in the processing performed by the image transfer control circuit 4 aforementioned, the original image read by the CCD scanner 14 and the hard copy obtained by the printer 17 are of the same size in the ratio of 1:1. Though such process is effective when copying or transmitting and receiving the drawing and the like by equimultiple, for the purpose of obtaining only the hard copy which is not necessarily copied or transmitted and received by equimultiple, it is sufficient to enlarge or reduce either in one direction. Such processing will be explained as follows.

It is assumed here that the original of A3 size of FIG. 6 (a) is divided in two and its length and widthwise are converted as shown in FIG. 6 (b) to obtain two hard copies of A4 size. In this case, 15.4 (=n) dots/mm in the subscanning direction S of the original of A3 size become 16 (=m) dots/mm in the main scanning direction MM of the hard copy of A4 size, thus it is reded by 15.4/16 (=n/m) times. Therefore, the main scanning direction M of the original must have been reduced by 15.4/16 (=n/m) times. Therefore, the main scanning direction M of the original must be reduced by 15.4/16 (=n/m) at this time. In addition, 16 (=m) dots/mm in the main scanning direction M of the original become 15.4 (=n) dots/mm in the main scanning direction MM of the hard copy, thus it must have been also reduced by 15.4/16 (=n/m) times at this stage.

Consequently, when the original image of A3 size is divided in two longitudinally to obtain the hard copies of A4 size, the image data in the subscanning direction S of the original must be given as the data to be printed in the main scanning direction MM by the printer 17 without being enlarged or reduced (actually the image printed or the hard copy is reduced by 15.4/16=n/m times), and the original image in the main scanning direction M must be reduced by $(15.4/16)^2$ or $(n/m)^2$ times to be given as the data to be printed in the subscanning direction SS or the printer 17. In this case, the obtained hard copy is reduced by about 0.96 (=15.4/16) times relative to the original.

Thus, as described hereabove, the image transfer control circuit 4 reads out the image data stored in the page memory 16 as the data to be printed by the printer 17 in the main scanning direction which has been the subscanning direction at reading of the original, transferring it as it is to the printer 17, and reads out the image data as the data to be printed by the printer 17 in the subscanning direction which has been the main scanning direction at reading of the original, reducing it by $(15.6/16)^2$ times to provide to the printer 17 and to obtain the hard copy.

More specifically, the processing may be accomplished by reading out only the n-th line successively which is an integral member satisfying the following equation from the page memory 16 for printing, $$[n \times (15.4/16)^2] - [(n-1) \times (15.4/16)^2] = 1$$

where [ ] is an Gaussian symbol, n increases successively from 1.

Consequently, two portions of A4 size obtained by dividing the original of A3 size in two are reduced by about 0.96 or 15.4/16 times as aforementioned to obtain the hard copy by the printer 17.

Now, it is often the case that, in general, several millimeters on both ends of the printer 17 in the main scanning direction become null. Therefore, when the aforementioned processing is performed and the original of A3 size is an image of one complete sheet (e.g. picture, photograph, drawing and the like), a portion of image on the original may be chipped off from the two hard copies of A4 size obtained by the printer 17.

In order to solve such a problem, the following processings are carried out in the printing apparatus of the present invention.

That is, as shown in FIG. 7, when one portion A obtained by dividing the A3 size original stored in the page memory 16 in two is printed by the pritner 17, the original image within the area between the end portion A0 and B1 which is set little over the center line C of the original of A3 size is read from the page memory 16 and printed by the printer 17. Meanwhile, when the other portion B is printed by the printer 17, the original image within the area between A1 which is set little over the center line C of the original of A3 size to the A side and the end portion B0 the B side is read from the page memory 16 and printed by the printer 17. The two hard copies AA and BB thus obtained are A4 size as a whole, but the image formed thereon are partly overlapped as shown by oblique lines. Thus, the image data of the original of A3 size printed on two A4 size original is not chipped off.

When the ratio of pel density between the main scanning direction and subscanning direction of the CCD scanner 14 is m:n=16:5.4, and the size of overlapped portion aforementioned (distance between A1 and C, C and B1 shown in FIG. 7) on the A3 size original is respectively set at about 0.04 or $[(16/15.4)-1]$ times of a short side of the A4 size, the image data corresponding to the width of A4 size is obtained on the hard copy.

Conversely, when the image data in the widthwise direction (main scanning direction M at reading of the original) of the A3 size original is outputted as it is to the printer 17 as the data to be printed in the lengthwise direction (subscanning direction SS) at printing, since the widthwise direction of the A3 size original is enlarged by 16/15.4 (=m/n) times on the hard copy, the image data in the lengthwise direction (subscanning direction S at reading of the original) of the A3 size original may be enlarged by $(16/15.4)^2$ or $(m/n)^2$ times and outputted to the printer 7 as the data to be printed thereby in the main scanning direction MM.

In the case aforementioned, the size of hard copy is about 1.04 times compared with the original in distance.

Figure 8:
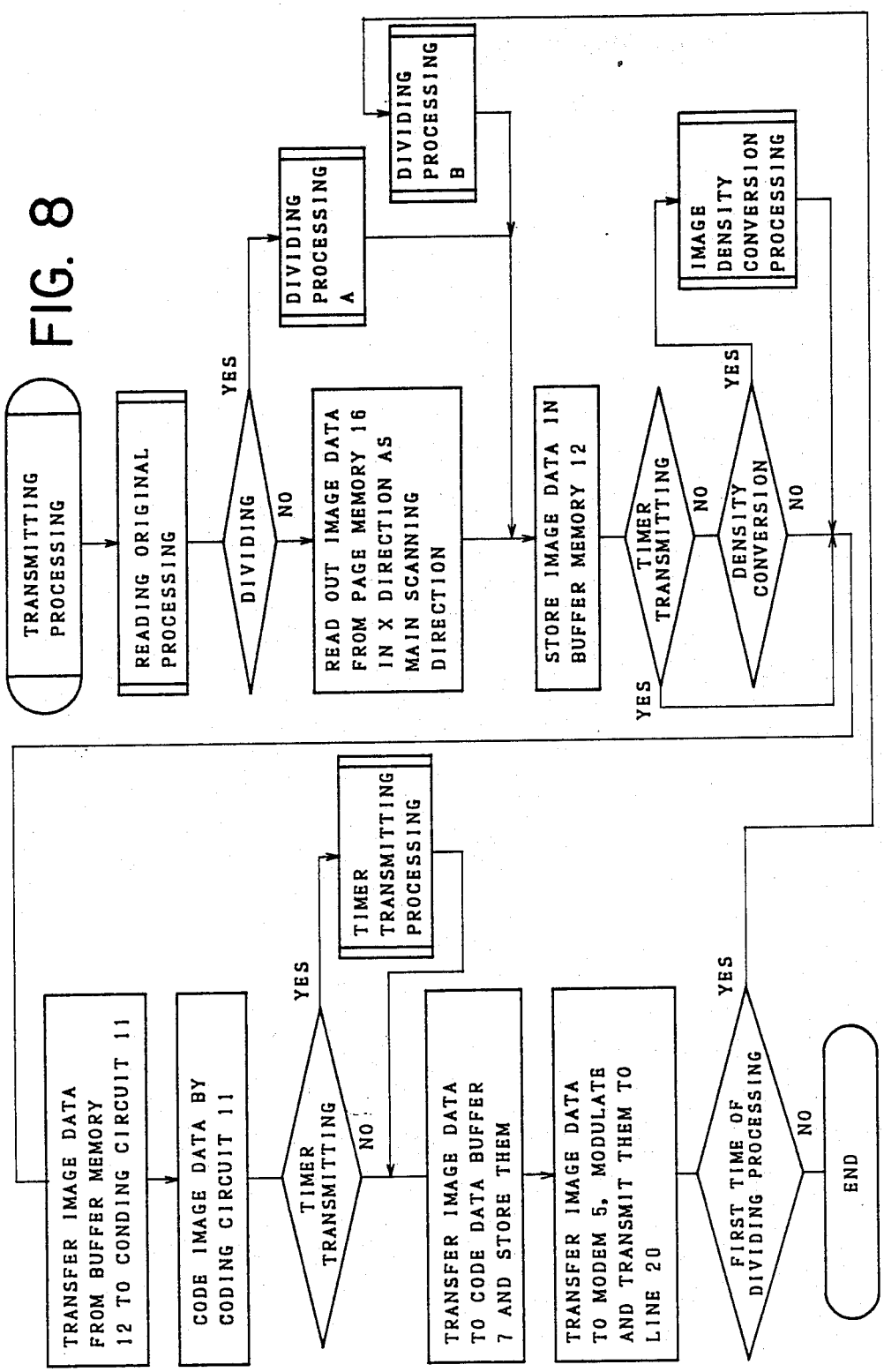
FIG. 8 is a flow chart showing procedures of transmission processing by a facsimile of the present invention.

Next, a transmitting operation will be described. FIG. 8 is a flow chart showing the procedures thereof.

When the instruction for transmission is given through the control panel and LCD panel 8, the main controller 1 reads the original and stores it temporarily in the page memory 16 in the same way as the case of aforementioned copying operation. The main controller 1 instructs the image transfer control circuit 4, transferring the image data stored in the page memory 16 successively to the coding circuit 11, encoding it into the code (e.g. run length code or the like) for the facsimile transmission and storing it successively in the code data buffer 7. When a fixed volume of code data is stored in the coding circuit 11, the main controller 1 instructs the communication control circuit 2 to modulate the code data stored in the code data buffer 7 by the modem 5 and to send it out to the line 20 through the network control circuit 6.

At the transmission, an image density conversion may be necessary in response to the capacity of the page memory or printer of the facsimile equipment on the receiver side. For example, when the facsimile equipment which receives a transmitted A3 size original includes the printer available for the maximum size of A4, the image must be reduced to the corresponding size before transmission.

Figure 9:
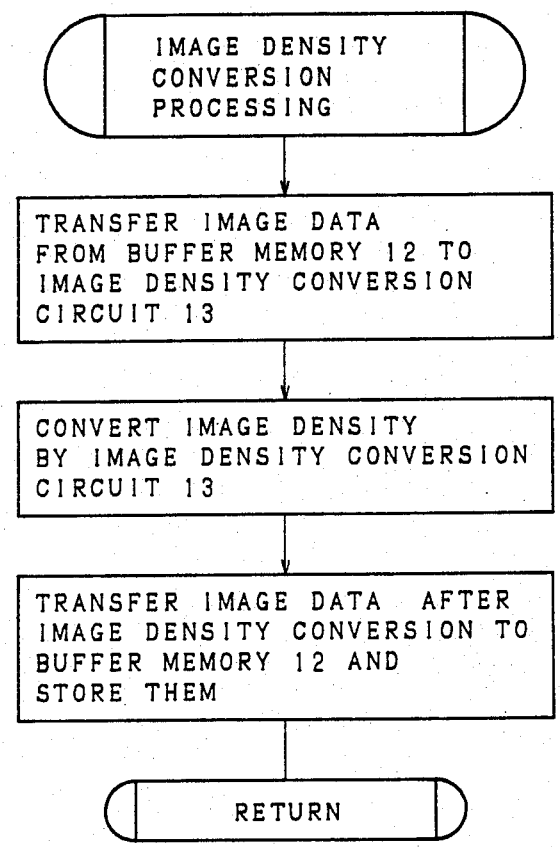
FIG. 9 is a flow chart showing procedures of an image density conversion.

In such case, as its procedure is shown in a flow chart of FIG. 9, after transferring the image data stored in the page memory 16 successively to the buffer 12 to be stored therein successively, the main controller 1 transfers it to the image density conversion circuit 13 to convert the image density before transferring it back to the buffer 12 to be stored therein. Thereafter, in the same way as the aforesaid transmitting operation, the image dadta is encoded by the coding circuit 11 and sent to the line 20 through the code data buffer 7, modem 5 and network control circuit 6.

Figure 10:
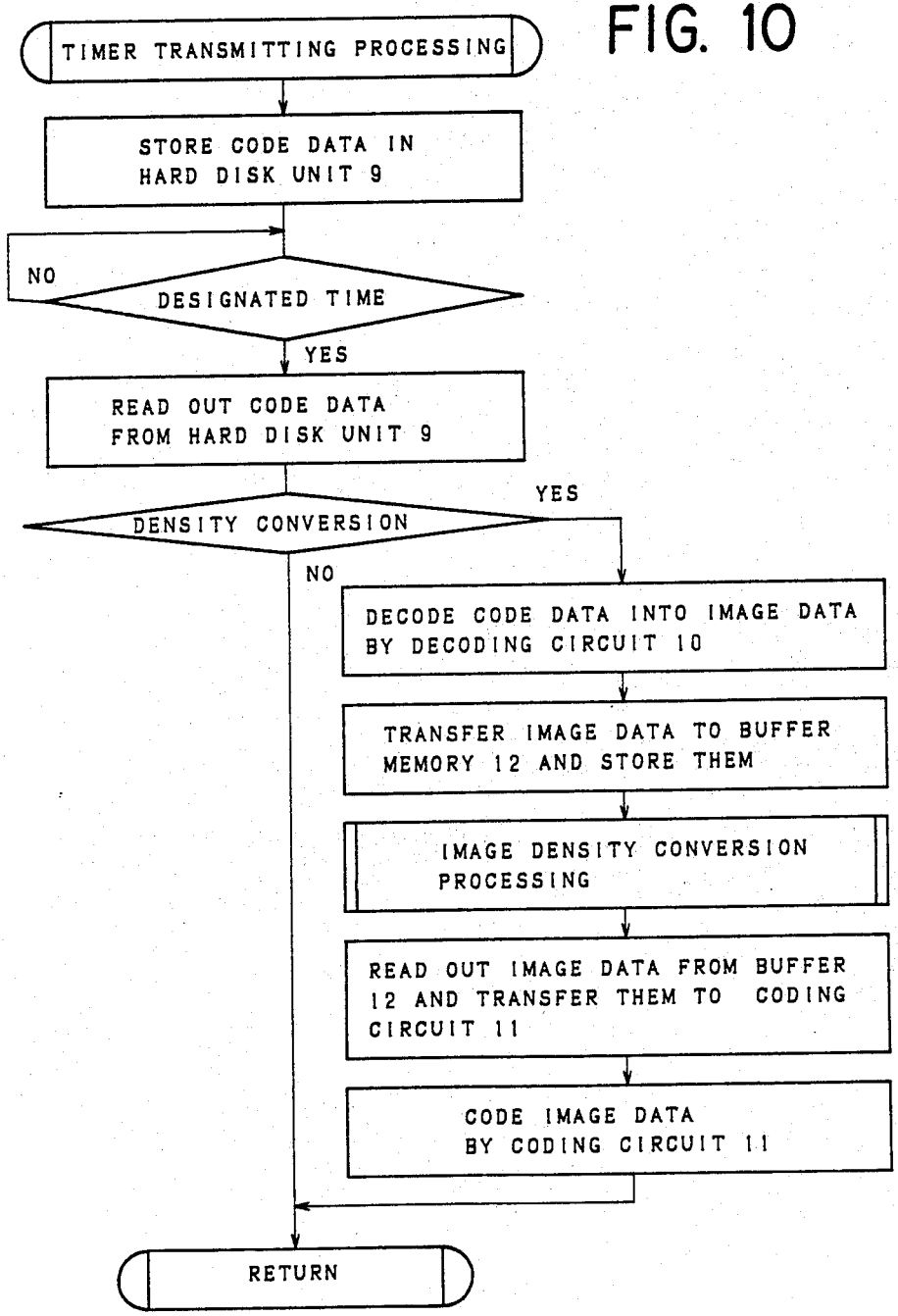
FIG. 10 is a flow chart showing procedures of timer transmission processing.

Furthermore, timer transmission is possible in the facsimile equipment of the present invention. This is intended for a large transmission during the night when lines are not comparatively crowded by setting the transmitting time in advance by operating the control panel and LCD panel 8. FIG. 10 is a flow chart showing procedures of the timer transmission processing.

When the timer transmission is instructed, the main controller 1 reads the original in advance in the same way as the cases of copying and transmitting operations, and stores the code data which has been encoded in the coding circuit 11 successively in the hard disk unit 9. When the designated time set previously arrives, the main controller 1 reads out the code data stored in the hard disk unit 9 and transfers it to the code data buffer 7, and in the same way as the usual communicating operation, sends it to the line 20. At this time, such processing as the image density conversion may be required depending upon the facsimile equipment on the receiver side, however, in such case, the main controller 1 transfers the code data read out from the hard disk unit 9 to the decoding circuit 10 to decode it into the image data, which is temporarily stored in the buffer memory 12. Thereafter, in the same way as the usual transmitting operation, the main controller 1 reads out the image data from the buffer memory 12, which is encoded by the coding circuit 11 again through the buffer memory 12 after being performed image density conversion by the image density conversion circuit 13, and is modulated in the modem 5 and sent out to the line 20.

Now, when transmitting the original of A3 size to the other facsimile equipment incorporating a printer of A4 size, though the original image is usually reduced by the image density conversion circuit 13 as aforementioned before transmission, however, in the facsimile equipment of the present invention, it is possible to transmit the A3 size original by dividing it into two images of A4 size. That is, in the same way as the previous copying operation, the image data stored in the page memory 16 may be read out after being divided it in two in the direction Y as the main scanning direction, and may be transmitted in the same way as the communicating operation described above.

Consequently, in the facsimile equipment on the receiver side, it is possible to receive two hard copies of A4 size with no distortion without reducing the original of A3 size.

Figure 11:
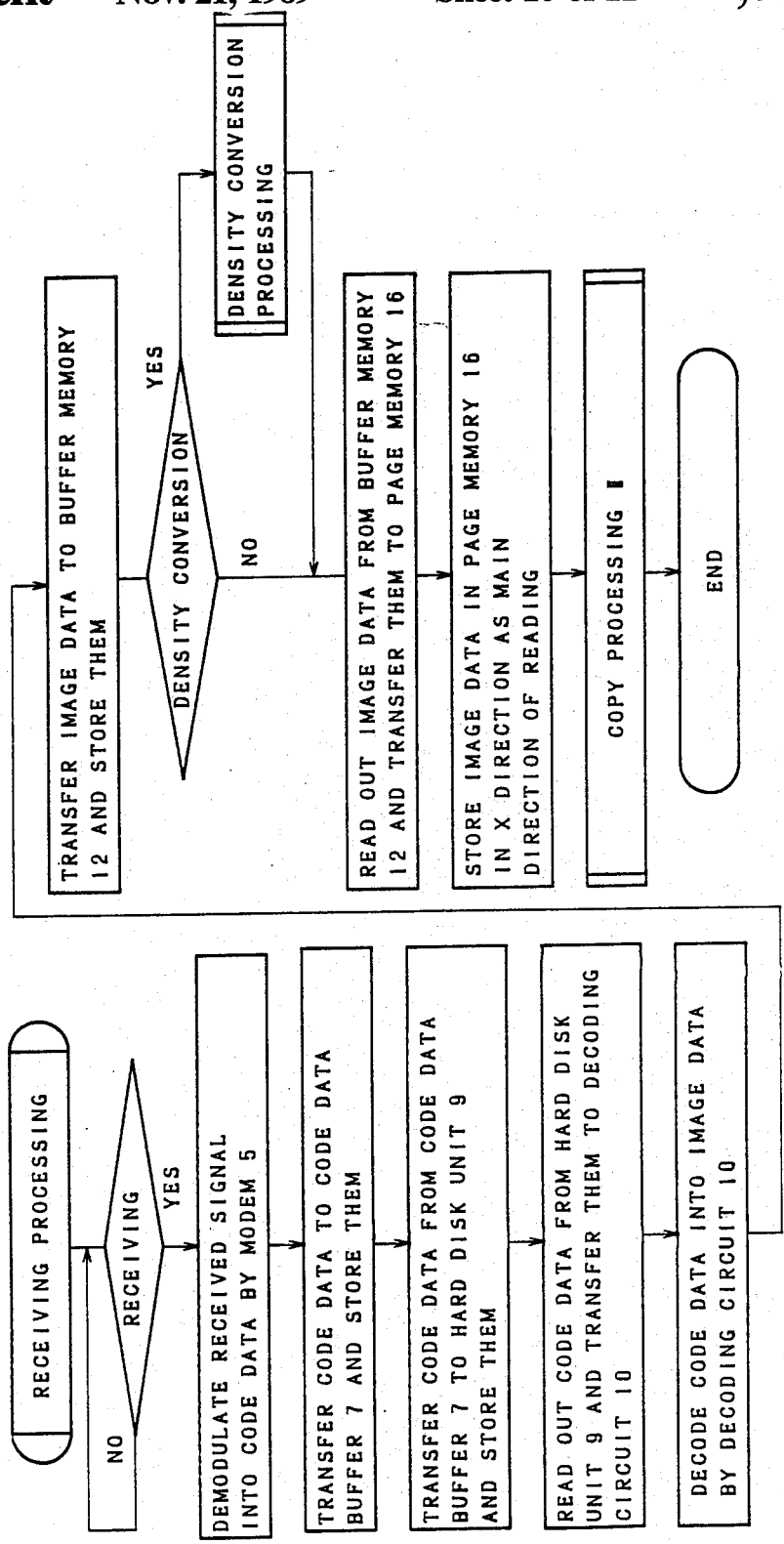
FIG. 11 is a flow chart showing procedures of receiving processing.

The receiving operation from the other facsimile equipment will now be described. FIG. 11 is a flow chart showing the procedures.

When a signal from the other facsimile equipment has been received, the communication control circuit 2 detects the signal by the network control circuit 6 and instructs the main controller 1. In consequence, when receiving is possible, the main controller 1 instructs the communication control circuit 2 and demodulates the received signal through the network control circuit 6 and modem 5, storing it successively in the code data buffer 7. When the storage capacity of the code data buffer 7 reaches a fixed volume, the main controller 1 reads out the data therefrom, transferring it to the hard disk unit 9 for storage.

Figure 12:
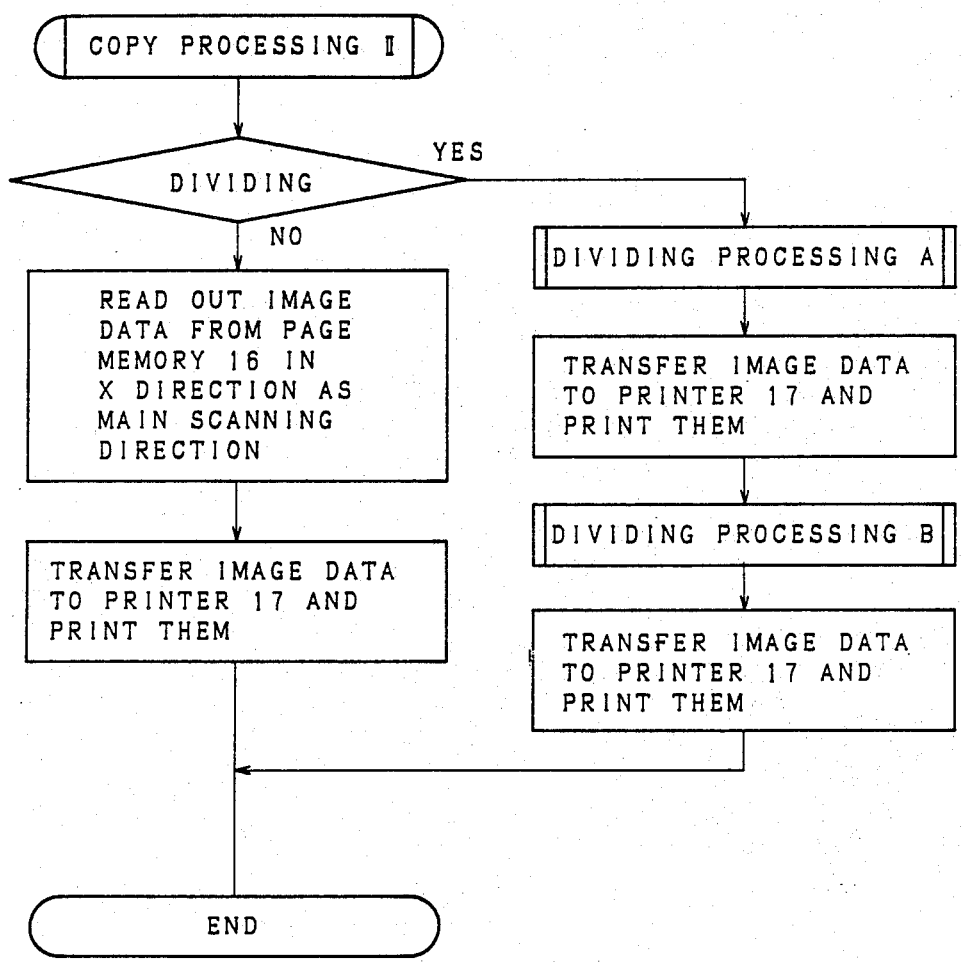
FIG. 12 is a flow chart showing procedures of copying processing (II).

When producing the hard copy of the image received from the other facsimile equipment, the main controller 1 reads out the code data stored in the hard disk unit 9, transferring it to the decoding circuit 10 to decode it into the image data. The image data decoded by the coding circuit 11 is stored temporarily in the buffer memory 12, thereafter being stored in the page memory 16 as the image data of one sheet of original in the direction X as the main scanning direction. Thereafter, the image data is processed to produce the hard copy substantially in the same way as the copying operation described above by the copying processing II, which is the same as the copying processing I except the reading of the original, shown in a flow chart in FIG. 12. At this time, if the image density conversion is necessary, the image may be processed by the image density conversion circuit 13 as described hereinbefore.

By the way, in the facsimile equipment of the present invention, it is possible to receive the original of A3 size read by the other facsimile equipment without dividing it in two, and dividing in two in the present apparatus to obtain the hard copy. Namely, during the communication control procedures, if the instruction is given in advance to divide the image data of A3 size received from the other facsimile equipment into two A4 size to produce the hard copy, the image data can be processed in the same way as the copying processing I aforementioned.

In the embodiment mentioned above, though the maximum possible read size of the CCD scanner 14 and the maximum possible print size of the printer 17 are set respectively at A3 and A4 sizes, it is to be understood that it is just an example and the other configurtion may be employed, or it may be so constructed that the image data of the original having a relatively larger size received from the other facsimile equipment is printed as the above embodiment, while having an image reading unit whose maximum possible reading size is relatively small.

Now, the printing apparatus of the present invention is also applicable when printing at the length/width ratio of 1:1 of the hard copy, not only in the case where the length and width at reading of the original and those at printing are converted, but also in the case where the length/width ratio of the number of dots of the image data read out from the page memory 16 and the ratio of resolutions at printing by the printer 17 are different.

More specifically, when the ratio of resolutions of the image data read out from the page memory 16 as the image data to be printed in the main scanning direction, and the image data read out from the page memory 16 as the image data to be printed in the subscanning direction is X:Y, and the resolutions of the printer 17 in the main scanning direction and subscanning direction is x:y, the image data may be read out from the page memory 16 and given to the printer 17 to be printed after being enlarged or reduced to meet $(x/X):(y/Y)$.

Thus, according to the present invention, even when the printing capacity of the printer is only A4 size though the image memory has the capacity for storing the image data of the original of A3 size, it is possible to obtain two hard copies of A4 size obtained by dividing the A3 size image in two without any distortion. Thus, the original of two opened pages of books, notebooks and the like or the original of A3 size with very small contents can be transmitted and reproduced in a high quality without any distortion. When the original is not necessary to be reproduced in full size, a fine hard copy of substantially the same size as the orginal can be produced without any distortion by a simple processing. In addition, since two pages of A4 size original can be transmitted or received as the one page image data, it is possible to reduce the possessing time of the communication circuit at transmission and receiving.

As this invention may be embodied in several forms without departing from the spirit of essential charactersitics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A printing apparatus comprising;
an image reading means which reads an original as dot data and outputs the dot data as image data;
an image memory which stores at least one sheet of image data read by said image reading means;
a printing means which prints the image data stored in said image memory as a dot image whose ratio of resolutions in the main scanning direction and subscanning direction is x:y; and
an image processing circuit which, when the ratio of resolutions of the data read out from said image memory as the data to be printed in the main scanning direction, and the data read out from said image memory as the data to be printed in the subscanning direction is X:Y (where $(x/X) \neq (y/Y)$), enlarges or reduces said data to be printed in the main scanning direction and said data to be in the subscanning direction to the ratio of $(x/X):(y/Y)$ to give them to said printing means.

2. A printing apparatus as set forth in claim 1, wherein said image processing circuit includes a scaling circuit which, by enlarging or reducing the data read out from said image memory as the data to be printed in the main scanning direction by $x/X$ times and by enlarging or reducing the data read out from said image memory as the data to be printed in the subscanning direction by $y/Y$ times, enlarges or reduces the two data to the ratio of $(x/X):(y/Y)$ to give them to said printing means.

3. A printing apparatus as set forth in claim 1, wherein said image processing circuit includes a scaling circuit which, by retaining the data read out from said image memory as the data to be printed in the main scanning direction by equimultiple and by enlarging or reducing the data read out from said image memory as the data to be printed in the subscanning direction by $(y/Y)^2$ times, enlarges or reduces said data to be printed in the main scanning direction and said data to be in the subscanning direction to the ratio of $(x/X):(y/Y)$ to give them to said printing means.

4. A printing apparatus as set forth in claim, wherein said image processing circuit includes a scaling circuit which, by enlarging or reducing the data read out from said image memory as the data to be pritned in the main scanning direction by $(x/X)^2$ times and retaining the data read out from said image memory as the data to be printed in the subscanning direction by equimultiple, enlarges or reduces said data to be printed in the main scanning direction and said data to be in the subscanning direction to the ratio of $(y/Y):(x/X)$ to give them to said printing means.

5. A printing apparatus comprising;
an image reading means which reads an original as dot data whose ratio of resolutions in the main scanning direction and subscanning direction is m:n ($m \neq n$) and outputs the dot data as image data;
an image memory which stores at least one sheet of image data read by said image reading means;
a printing means which prints the image data stored in said image memory as a dot image whose ratio of resolutions in the main scanning direction and subscanning direction is m:n; and
an image processing circuit which reads out the image data read in the subscanning direction at reading of the original as the data to be printed in the main scanning direction, and the image data read in the main scanning direction at reading of the original as the data to be printed in the subscanning direction from said image memory, and enlarges or reduces said data to be printed in the main scanning direction and said data to be in the subscanning direction to the ratio of $(m/n):(n/m)$ to give them to said printing means.

6. A printing apparatus as set forth in claim 5, wherein said image processing circuit includes a scaling circuit which, by enlarging or reducing the image data read in the subscanning direction at reading of the original by $m/n$ times as the data to be printed in the main scanning direction and by enlarging or reducing the image data read in the main scanning direction at reading of the original by $n/m$ times as the data to be printed in the subscanning direction, enlarges or reduces said data to be printed in the main scanning direction and said data to be in the subscanning direction to the ratio of $(m/n):(n/m)$ to give them to said printing means.

7. A printing apparatus as set forth in claim 6, wherein said image processing circuit divides the image data in two portions in the subscanning direction at reading of the original to read out it from said image memory.

8. A printign apparatus as set forth in claim 5, wherein said image processing circuit includes a scaling circuit which, by retaining the image data read in the subscanning direction at reading of the original by equimultiple as the data to be printed in the main scanning direction and by enlarging or reducing the image data read in the main scanning direction at reading of the original by $(n/m)^2$ times as the data to be printed in the subscanning direction, enlarges or reduces said data to be printed in the main scanning direction and said data to be in the subscanning direction to the ratio of $(m/n):(n/m)$ to give them to said printing means.

9. A printing apparatus as set forth in claim 8, wherein said image processing circuit divides the image data in two portions in the subscanning direction at reading of the original to read out it from said image memory.

10. A printing apparatus as set forth in claim 5, wherein said image processing circuit includes a scaling circuit which, by enlarging or reducing the image data read in the subscanning direction at reading of the original by $(m/n)^2$ times as the data to be printed in the main scanning direction and by retaining the image data read in the main scanning direction at reading of the original at equimultiple as the data to be printed in the subscanning direction, enlarges or reduces said data to be printed in the main scanning direction and said data to be in the subscanning direction to the ratio of $(n/m):(m/n)$ to give them to said printing means.

11. A printing apparatus as set forth in claim 10, wherein said image processing circuit divides the image data in two portions in the subscanning direction at reading of the original to read out it from said image memory.

12. A printing apparatus as set forth in claim 10, wherein said image processing circuit reads out the image data from said image memory and divides it in two portions, one covering from the start position in the subscanning direction at reading of the original to little over midpoint between the start position and the end position, and the other covering from little before said midpoint to the end position.

13. A facsimile equipment which incorporates a printing apparatus comprising;

an image reading means which reads an original as dot data whose ratio of resolutions in the main scanning direction and subscanning direction is m:n (m≠n) and outputs the dot data as image data;

an image memory which stores one sheet of image data read by said image reading means;

a printing means which prints the image data stored in said image memory as a dot image whose ratio of resolutions in the main scanning direction and subscanning direction is m:n; and an image processing circuit which reads out the image data read in the subscanning direction at reading of the original as the data to be printed in the main scanning direction, and the image data read in the main scanning direction at reading of the original as the data to be printed in the subscanning direction from said image memory, and enlarges or reduces said data to be printed in the main scanning direction and said data to be in the subscanning direction to the ratio of (m/n):(n/m) to give them to said printing means.

14. A facsimile equipment as set forth in claim 13, wherein said image processing circuit includes scaling circuit which, by enlarging or reducing the imgae data read in the subscanning direction at reading of the original by m/n times as the data to be printed in the main scanning direction and by enlarging or reducing the image data read in the main scanning direction at reading of the original by n/m times as the data to be printed in the subscanning direction, enlarges or reduces said data to be printed in the main scanning direction and said data to be in the subscanning direction to the ratio of (m/n):(n/m) to give them to said printing means.

15. A facsimile equipment as set forth in claim 14, wherein said image processing circuit divides the image data in two portions in the subscanning direction at reading of the original to read out it from said image memory.

16. A facsimile equipment as set forth in claim 13, wherein said image processing circuit includes a scaling circuit which, by retaining the image data read in the subscanning direction at reading of the original by equimultiple as the data to be printed in the main scanning direction and by enlarging or reducing the image data read in the main scanning direction at reading of the original by $(n/m)^2$ times as the data to be printed in the subscanning direction, enlarges or reduces said data to be printed in the main scanning direction and said data to be in the subscanning direction to the ratio of (m/n):(n/m) to give them to said printing means.

17. A facsimile equipment as set forth in claim 16, wherein said image processing circuit divides the image data in two portions in the subscanning direction at reading of the original to read out it from said image memory.

18. A facsimile equipment as set forth in claim 13, wherein said image processing circuit includes a scaling circuit which, by enlarging or reducing the image data read in the subscanning direction at reading of the original by $(m/n)^2$ times as the data to be printed in the main scanning direction and by retaining the image data read in the main scanning direction at reading of the original at equimultiple as the data to be printed in the subscanning direction, enlarges or reduces said data to be printed in the main scanning direction and said data to be in the subscanning direction to the ratio of (n/m):(m/n) to give them to said printing means.

19. A facsimile equipment as set forth in claim 18, wherein said image processing circuit divides the image data in two portions in the subscanning direction at reading of the original to read out it from said image memory.

20. A facsimile equipment as set forth in claim 18, wherein said image processing circuit reads out the image data from said image memory and divides it in two portions, one covering from the start position in the subscanning direction at reading of the original to little over midpoint between the start position and the end position, and the other covering from little before the midpoint to the end position.

21. A facsimile equipment comprising;
a receiving means which receives the image data read as dot data whose ratio of resolutions in the main scanning direction and subscanning direction is m:n (m≠n) and outputs the dot data as image data;

an image memory which stores at least one sheet of image data received by said receiving means;

a printing means which prints the image data stored in said image memory as the dot image whose ratio of resolutions in the main scanning direction and subscanning direction is m:n; and an image processing circuit which reads out the image data read in the subscanning direction at reading of the original as the data to be printed in the main scanning direction and the image data read in the main scanning direction at reading of the original as the data to be printed in the subscanning direction from said image memory, enlarging or reducing the said data to be printed in the main scanning direction and said data to be in the subscanning direction to the ratio of (n/m):(m/n) to give them to said printing means.

22. A facsimile equipment as set forth in claim 21, wherein said image processing circuit includes a scaling circuit which, by enlarging or reducing the image data read in the subscanning direction at reading of the original by m/n times as the data to be printed in the main scanning direction and be enlarging or reducing the image data read in the main scanning direction at reading of the original by n/m times as the data to be printed in the subscanning direction, enlarges or reduces said data to be printed in the main scanning direction and said data to be in the subscanning direction to the ratio of (m/n):(n/m) to give them to said printing means.

23. A facsimile equipment as set forth in claim 22, wherein said image processing circuit divides the image data in two portions in the subscanning direction at reading of the original to read out it from said from image memory.

24. A facsimile equipment as set forth in claim 21, wherein said image processing circuit includes a scaling circuit which, by retaining the image data read in the subscanning direction at reading of the original by equimultiple as the data to be printed in the main scanning direction and by enlarging or reducing the image data read in the main scanning direction at reading of the original by $(n/m)^2$ times as the data to be printed in the subscanning direction, enlarges or reduces said data to be printed in the main scanning direction and said data to be in the subscanning direction to the ratio of (m/n):(n/m) to give them to said printing means.

25. A facsimile equipment as set forth in claim 24, wherein said image processing circuit divides the image data in two portions in the subscanning direction at reading of the original to read out it from said image memory.

26. A facsimile equipment are set forth in claim 21, wherein said image processing circuit includes a scaling circuit which, by enlarging or reducing the image data read in the subscanning direction at reading of the original by $(m/n)^2$ times as the data to be printed in the main scanning direction and by retaining the image data read in the main scanning direction at reading of the original at equimultiple as the data to be printed in the subscanning direction, enlarges or reduces said data to be printed in the main scanning direction and said data to be in the subscanning direction to the ratio of $(n/m):(m/n)$ to give them to said printing means.

27. A facsimile equipment as set forth in claim 26, wherein said image processing circuit divides the image data in two portions in the subscanning direction at reading of the original to read out it from said image memory.

28. A facsimile equipment as set forth in claim 26, wherein said image processing circuit reads out the image data from said image memory and divides it in two portions, one covering from the start position in the subscanning direction at reading of the original to little over midpoint between the start position and the end position, and the other covering from little before the midpoint to the end position.

* * * * *